United States Patent
Ehrlich et al.

(10) Patent No.: US 10,260,626 B2
(45) Date of Patent: Apr. 16, 2019

(54) CAM MECHANISM FOR ACTUATING A SELECTOR SHAFT

(71) Applicant: Schaeffler Technologies AG & Co. KG, Herzogenaurach (DE)

(72) Inventors: Matthias Ehrlich, Buehl (DE); Volker Kretz-Busch, Ottersweier (DE); Jerome Malitourne, Drusenheim (FR); Eugen Kombowski, Malsch (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 319 days.

(21) Appl. No.: 15/127,110

(22) PCT Filed: Feb. 24, 2015

(86) PCT No.: PCT/DE2015/200099
§ 371 (c)(1),
(2) Date: Sep. 19, 2016

(87) PCT Pub. No.: WO2015/044152
PCT Pub. Date: Oct. 1, 2015

(65) Prior Publication Data
US 2017/0122432 A1    May 4, 2017

(30) Foreign Application Priority Data
Mar. 26, 2014  (DE) .......................... 10 2014 205 659

(51) Int. Cl.
*F16H 59/00*  (2006.01)
*F16H 61/00*  (2006.01)
(Continued)

(52) U.S. Cl.
CPC ..... *F16H 61/32* (2013.01); *F16H 2061/2838* (2013.01); *F16H 2061/2869* (2013.01); *F16H 2061/2884* (2013.01)

(58) Field of Classification Search
CPC ............. F16H 61/32; F16H 2061/2838; F16H 2061/2869; F16H 2061/2884
See application file for complete search history.

(56) References Cited

U.S. PATENT DOCUMENTS 5,740,695 A * 4/1998 Janson .................... F16H 63/32
74/337.5
5,988,009 A * 11/1999 Tornatore ................ F16H 61/28
74/337.5

FOREIGN PATENT DOCUMENTS

| DE | 102004038955 | 3/2005 |
| DE | 102006054901 | 6/2007 |
| DE | 102013207871 | 10/2014 |

* cited by examiner

*Primary Examiner* — Jake Cook
(74) *Attorney, Agent, or Firm* — Brooks Kushman P.C.

(57) ABSTRACT

A cam mechanism for actuating a selector shaft, in particular for a single-motor gearshift actuation device, in particular to carry out a selecting movement of the selector shaft, comprising a cylindrical outer body having an inner circumferential surface and a cam track disposed on the inner circumferential surface and having an endless periodicity in a circumferential direction with at least one highest point and at least one lowest point, an inner body having at least one sliding guide extending in a direction perpendicular to the circumferential direction, at least one guide element disposed in the cam track and in the sliding and suitable for transmitting a movement of the guide element in a direction perpendicular to the circumferential direction to a selector shaft.

13 Claims, 5 Drawing Sheets

(51) Int. Cl.
*F16H 63/00* (2006.01)
*F16H 61/32* (2006.01)
*F16H 61/28* (2006.01)

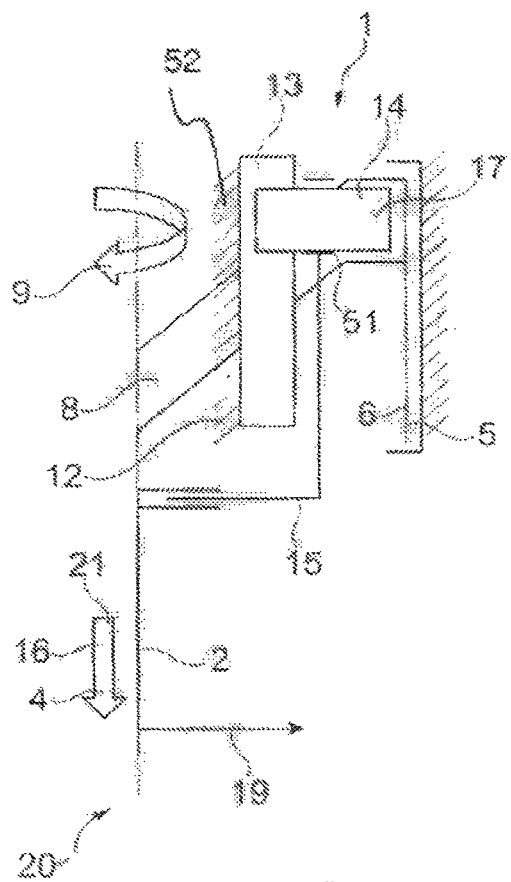
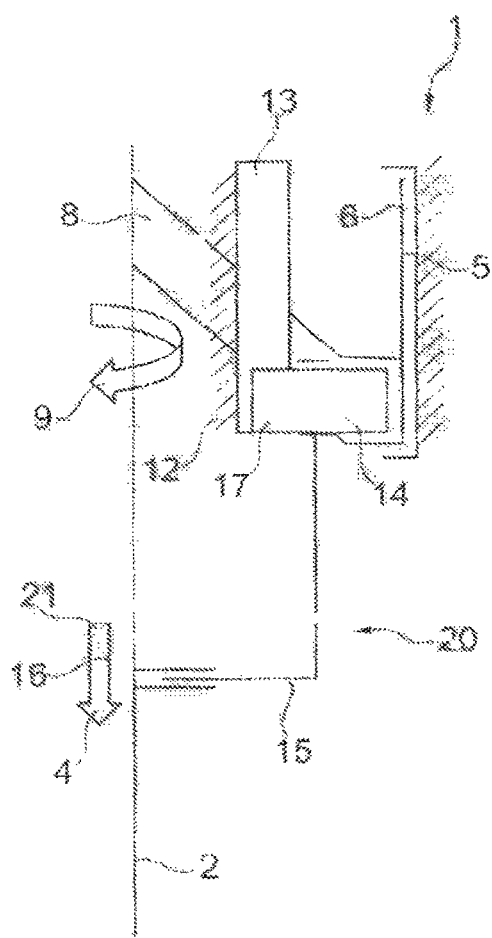
Fig. 3
Fig. 4

CAM MECHANISM FOR ACTUATING A SELECTOR SHAFT

CROSS-REFERENCE TO RELATED APPLICATIONS

The present application is the United States National Stage Application pursuant to 35 U.S.C. § 371 of International Patent Application No. PCT/DE2015/200099, filed on Feb. 24, 2015, and claims priority to German Patent Application No. DE 10 2014 205 659.4 of Mar. 26, 2014, which applications are incorporated by reference in their entireties.

FIELD

The invention relates to a cam mechanism for actuating a selector shaft, in particular, for single-engine gearshift actuation, in particular, for carrying out the selecting movement of the selector shaft.

BACKGROUND

In accordance with the invention, a gearshift actuation device (gearshift actuator) is, in particular, understood to be a gearshift actuator that acts to operate at least one of the following devices in a motor vehicle: vehicle transmission, clutch and brake in an actuating, selecting, and/or shifting process.

It is known for the gears of motor vehicles to be engaged and disengaged by a motor vehicle transmission such as an auto shift gearbox, parallel shift gearbox, double clutch transmission, or other similar types of transmissions, by means of a gearshift actuator forming what is known as an outer gearshift actuation device. Such a gearshift actuator needs to carry out a selecting movement and a shifting movement to engage and disengage predefined gears. For this purpose, gearshift actuators are usually equipped with two motors, one for the selecting movement and one for the shifting movement.

It has become known from DE 10 2004 038 955 A1 to use only one electric motor in a gearshift actuating device of a motor vehicle to carry out the selecting movement as well as the shifting movement in the transmission. A gearshift actuator of this type is thus referred to as a single-motor gearshift actuator.

Moreover, DE 10 2006 054 901 A1 discloses to design this single-motor gearshift actuator in such a way that rotation of an electric motor in one direction results in a shifting movement, whereas a corresponding movement of the electric motor in the other direction results in a selecting movement of the selector shaft.

DE 10 2013 207 871 proposes a single-motor gearshift actuator in which the selecting movement and the shifting movement are carried out by means of a single motor. The present invention in particular focuses on providing a cam mechanism for this single-motor actuation device.

SUMMARY

Based hereon, an object of the present invention is, at least partly, to overcome the disadvantages known from the prior art and to propose a cam mechanism that may be used in the novel single-motor gearshift actuator.

The invention relates to a cam mechanism for actuating a selector shaft, in particular, for a single-motor gearshift actuation device, in particular, for carrying out a selecting movement of the selector shaft, at the minimum comprising a cylindrical outer body having an inner circumferential surface and a cam track disposed on the inner circumferential surface, the cam track having an endless periodicity in a circumferential direction with at least one highest point and at least one lowest point, an inner body having at least one sliding guide extending in a direction perpendicular to the circumferential direction, at least one guide element disposed in the cam track and in or on the sliding guide, and a transmission element in operative connection with the at least one guide element or including the at least one guide element and suitable for transmitting a movement of the guide element in a direction perpendicular to the circumferential direction to a selector shaft arrangeable to be concentric with the inner circumferential surface.

The guide element is in particular a rolling body or a ball or a type of pin that is firmly connected to the transmission element (i.e. is an integral part thereof or forms a material connection therewith). Rolling bodies for instance include cylindrical bodies with a round circumferential surface.

In accordance with a preferred embodiment, the outer body comprises at least two parts. The first part includes the cam track with the highest point and the second part includes the cam track with the lowest point. This arrangement is of particular advantage for an assembly of the components. The outer body may in particular be designed as one piece. The outer body may have a number of pieces; the division of the cam track into the lowest point and the highest point is not compulsory.

It is furthermore envisaged for the outer body, in particular, to be movable in the circumferential direction independently of the transmission element and the sliding guide. In particular, the sliding guide and the transmission element are not movable in a circumferential direction, but the outer body is. In particular, at least the sliding guide is fixed to the housing of the gearbox actuation device. In particular, the transmission element, together with the selector shaft, is only movable up and down relative to the outer body. In particular, the selector shaft is free to rotate in the circumferential direction relative to the transmission element.

In particular, an operative connection of transmission element and guide element is disposed radially between the sliding guide and the cam track, i.e., in particular, between the inner body and the outer body.

The cam mechanism preferably includes two guide elements and thus two transmission elements and two sliding guides and the two guide elements are disposed opposite one another in the cam track on the inner circumferential surface of the outer body.

Furthermore, a cam mechanism arrangement is proposed comprising a cam mechanism of the invention and a selector shaft, the selector shaft disposed to be concentric with the inner circumferential surface and connected to the at least one transmission element in such a way that the selector shaft is free to rotate in the circumferential direction relative to the transmission element, allowing the selector shaft to rotate freely in the circumferential direction relative to the outer body and relative to the transmission element and to move up and down together with the transmission element in a direction perpendicular to the circumferential direction.

Furthermore a method for assembling a cam mechanism of the invention is proposed, the method at least comprising the steps of: (i) providing a cylindrical outer body having an inner circumferential surface and a cam track disposed on the inner circumferential surface, the cam track having an endless periodicity including at least one highest point and at least one lowest point, wherein the outer body has two parts, the cam track with the highest point disposed in the first part and the cam track with the lowest point disposed in the second part; (ii) providing at least one guide element; (iii) providing at least one transmission element; (iv) arranging the first part or the second part with the at least one transmission element and the at least one guide element relative to one another in such a way that the guide element is disposed in the cam track and in operative connection with the transmission element; and, (v) joining the first part and the second part to form the cam track.

In particular, a locking mechanism is provided firmly to connect the first part and the second part to one another.

Furthermore, a method for assembling a cam mechanism of the invention is proposed, the method at least comprising the steps of: (a) providing a cam mechanism after step (v); (b) providing a selector shaft; and, (c) connecting the at least one transmission element to the selector shaft.

Furthermore a method for assembling a cam mechanism or a cam mechanism arrangement is proposed wherein the at least one sliding guide is connected to a housing of the single-motor gearshift actuation device (fixed to the housing) and wherein subsequently the cam mechanism or the cam mechanism arrangement is operatively connected to the sliding guide and the housing.

The features that are individually listed in the patent claims may be combined with one another in any way that makes sense from a technological point of view and may be enhanced by explanatory facts from the description and details from the figures, creating further alternative embodiments of the invention.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is a side view of a cam mechanism in a first position;

FIG. 4 is a side view of a cam mechanism in a second position;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
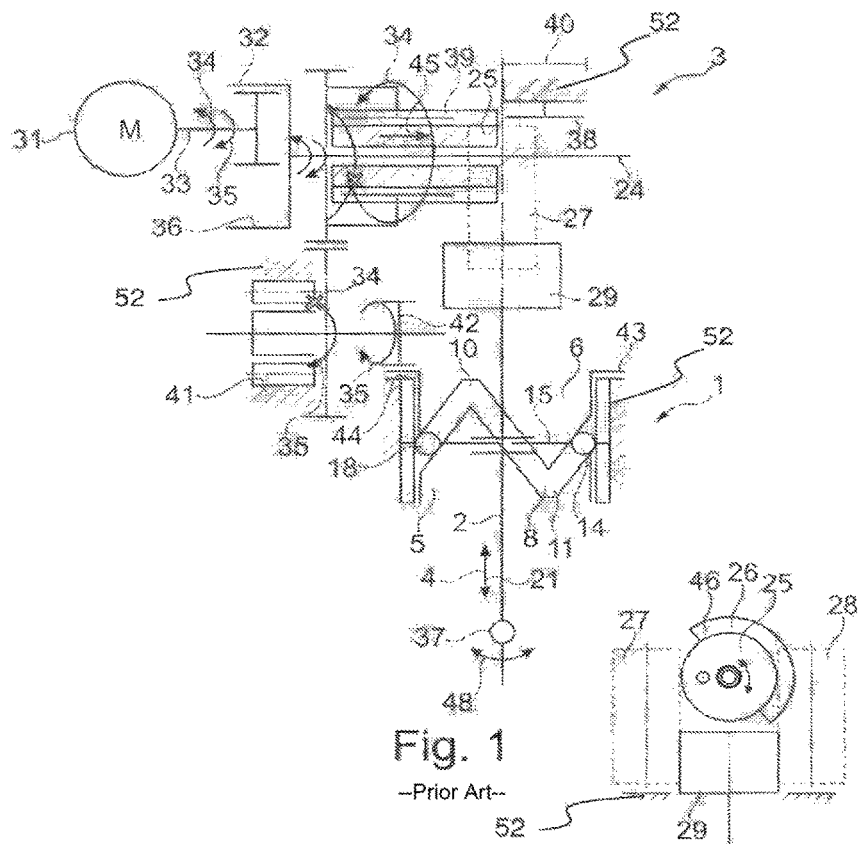
FIG. 1 illustrates a single-motor gearshift actuation device from the prior art in accordance with DE 10 2013 207 871.

FIG. 1 illustrates single-motor gearshift actuation device 3 from the prior art in accordance with DE 10 2013 207 871. Via suitable motor spindle 33, motor 31 drives spur gear spline 32. Both directions of rotation 34, 35 are possible. Spur gear spline 32 meshes with inner hollow gear spline 36, which in the present example directly drives spindle 24 (a threaded spindle). Depending on the direction of rotation of motor spindle 33 of motor 31, spindle 24 likewise carries out a rotational movement in a first direction of rotation 34 or in an opposite second direction of rotation 35.

Spindle nut 25 is disposed on (threaded) spindle 24. Via spline 46, spindle nut 25 is in engagement with a respective one of two gears 27, 28, which themselves are operatively connected to selector shaft 2 via shaft gear 29. An axial adjustment of spindle nut 25 causes one of the two gears 27, 28 to rotate. This rotation causes shaft gear 29 to rotate and consequently shift lever 37, disposed on selector shaft 2, is pivoted. Shift lever 37 interacts with motor vehicle transmission device 47, which has a plurality of transmission ratios for different gears. The pivoting movement of shift lever 37 implements shifting movement 48.

When spindle nut 25 is moved along spindle 24 into first axial position region 40 of spindle 24, it engages with locking mechanism 38 that prevents spindle nut 25 from rotating. In every axial position region, spindle nut 25 is in operative connection with third gear 39. As long as spindle nut 25 is engaged with locking mechanism 38, spindle nut 25 and third gear 39 cannot rotate. Rotation is impossible until spindle nut 25 has moved far enough out of first axial position region 40 and along spindle 24 into a different axial region until spindle nut 25 and locking mechanism 38 are out of engagement. Third gear 39 connects spindle nut 25 to freewheel 41. Freewheel 41 only allows rotation in second direction of rotation 35, causing spindle nut 25 to be able to carry out a rotational movement exclusively in first direction of rotation 34. Selector gear 42 is also disposed on the axis of rotation of freewheel 41. Selector gear 42 transmits the rotation of spindle nut 25/motor spindle 33 to selector pot 43 (in the present case, cam mechanism 1). For this purpose, selector pot 43 has crown spline 44 interacting with selector gear 42. Selector pot 43 may likewise rotate only in one direction of rotation. With the aid of cam track 8 disposed on its inner circumferential surface 6, it transforms the rotational movement into an up and down movement of guide elements 14 in direction 21, perpendicular to circumferential direction 9. Guide elements 14 are disposed in cam track 8 and are connected to selector shaft 2 by transmission element 15.

The up and down movement of guide elements 14 corresponds to selection movement 4 of shift lever 37. Selection movement 4 is carried out as long as motor 31 moves in first direction of rotation 34. In this process, spindle nut 25 is likewise rotated far enough for spline 46 of spindle nut 25, which is designed as gear rack 26, to be in operative connection with first gear 27 or second gear 28. When motor 31 changes its direction of rotation, selection movement 4 stops because of freewheel 41. However, now spindle 24 continues to rotate and the fixed spindle nut 25 (fixed in the direction of rotation) moves along spindle 24 back into first axial position region 40, in which a rotational movement is also prevented by locking mechanism 38. During axial movement 45 of spindle nut 25, spindle nut 25, via spline 46, is in engagement with the selected one of two gears 27, 28, which are in operative connection with selector shaft 2. Thus, axial movement 45 of spindle nut 25 implements shifting movement 48, which comprises a rotation of selector shaft 2. During shifting movement 48, selector shaft 2 rotates independently of transmission element 15 and of guide elements 14 and selector pot 43. Thus, neither of guide elements 14 are moved (up and down) in cam track 8 during shifting movement 48.

Single-motor gearshift actuation device 3 has housing 52 and individual actuation device components firmly connected to housing 52, in particular motor 31, sliding guide 13, and locking device 38.

The description and explanations of the single-motor gearshift actuation device DE 10 2013 207 871 are hereby incorporated in their entirety by reference herein.

Figure 2:
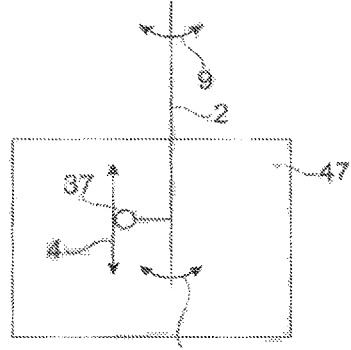
FIG. 2 illustrates a detail of FIG. 1 in a view rotated through 90°.

FIG. 2 illustrates a detail of FIG. 1 in a representation in which it has been rotated through 90°. Here, spindle nut 25 is in engagement with second gear 28 via spline 46, causing axial movement 45 (see FIG. 1) to rotate second gear 28 and thus to rotate the shaft gear, resulting in shifting movement 48 of selector shaft 2. When selector shaft 2 rotates, shift lever 37 disposed on selector shaft 2 carries out shifting movement 48 in circumferential direction 9 to actuate motor vehicle transmission device 47 and to shift into a gear.

FIG. 3 is a lateral view of cam mechanism 1 or cam mechanism arrangement 20 in a first position, cam mechanism arrangement 20 comprising cam mechanism 1 and selector shaft 2. Selector pot 43 shown in FIG. 1 is cam mechanism 1 of the invention described above, comprising outer body 5 with inner circumferential surface 6 and cam track 8 disposed on inner circumferential surface 6 and having an endless periodicity in circumferential direction 9 with at least one highest point 10 and at least one lowest point 11 (not shown herein). Furthermore, inner body 12 is disposed inside inner circumferential surface 6 and thus inside outer body 5, inner body 12 having at least one sliding guide 13 disposed to be perpendicular to circumferential direction 9. Guide element 14 that is simultaneously movable in cam track 8 and in sliding guide 13 is disposed in sliding guide 13. Guide element 14, here rolling body 17 (a cylinder), is in operative connection with transmission element 15 for transmitting movement 16 of guide element 14 in direction 21, perpendicular to circumferential direction 9, to selector shaft 2 disposed to be concentric with inner circumferential surface 6. It can be seen that selector shaft 2 is disposed to rotate freely relative to transmission element 15. However, movement 16 of guide element 14 in direction 21, perpendicular to circumferential direction 9, is transmitted to selector shaft 2 via transmission element 15, so that selector shaft 2 carries out selecting movement 4. In a radial direction, transmission element 15, namely the part of transmission element 15 that guides guide element 14, is in operative connection with guide element 14, and is at least partly disposed between sliding guide 13 and cam track 8.

FIG. 4 is a side view of cam mechanism 1 in a second position. Reference is made to the explanations in the context of FIG. 1. Here, guide element 14 is disposed in the region of lowest point 11 of cam track 8. Accordingly, selector shaft 2 has been moved downward in direction 21, perpendicular to circumferential direction 9. Selector shaft 2 and cam mechanism 1 form cam mechanism arrangement 20.

Figure 5:
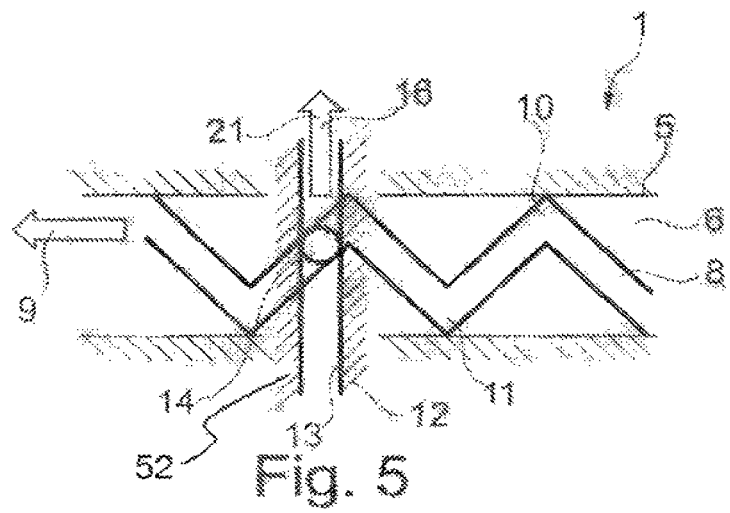
FIG. 5 is a developed view of the cam track of the cam mechanism in a first position.

FIG. 5 is a developed view of cam track 8 of cam mechanism 1 in a first position. Cam track 8 is disposed on inner circumferential surface 6 of outer body 5 and has an endless periodicity in the direction of inner circumference 9 with, in the present case, several highest points 10 and several lowest points 11. Guide element 14 is simultaneously disposed in sliding guide 13 of inner body 12 and in cam track 8 of outer body 5. When outer body 5 moves in circumferential direction 9 relative to sliding guide 13, guide element 14 moves along cam track 8 from lowest point 11 to highest point 10 and further on to the next lowest point 11 etc. In this process, guide element 14 is disposed in sliding guide 13 at all times, carrying out an up and down movement 16 in direction 21, perpendicular to circumferential direction 9.

Figure 6:
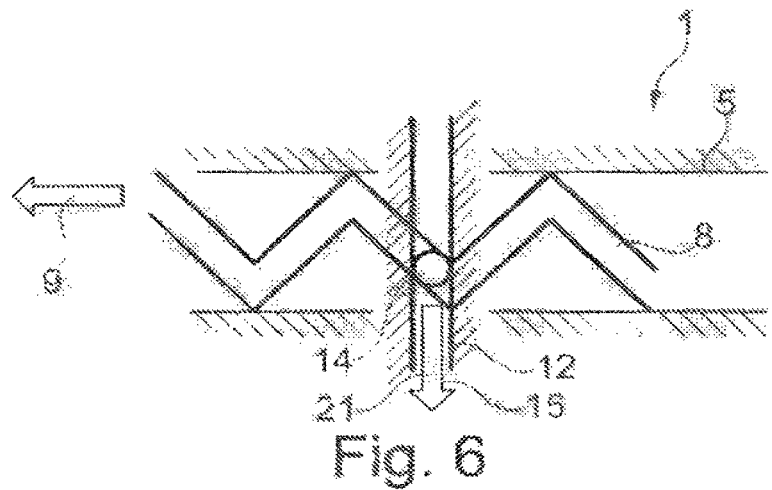
FIG. 6 is a developed view of the cam track of the cam mechanism in a second position.

FIG. 6 is a developed view of cam track 8 of cam mechanism 1 in a second position. Here, guide element 14 is disposed in the region of lowest point 11 of cam track 8.

Figure 7:
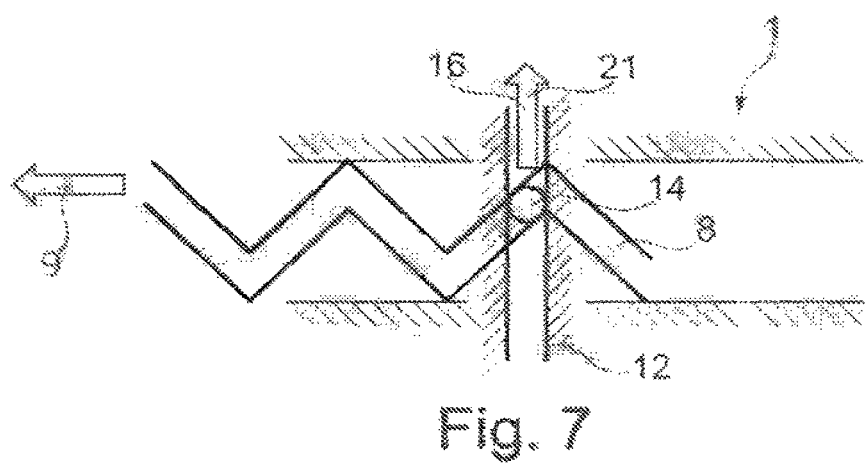
FIG. 7 is a developed view of the cam track of the cam mechanism in a third position.

FIG. 7 is a developed view of cam track 8 of cam mechanism 1 in a third position. Here, guide element 14 has moved from lowest point 11 (see FIG. 6) to the adjacent highest point 10 in cam track 8.

Figure 8:
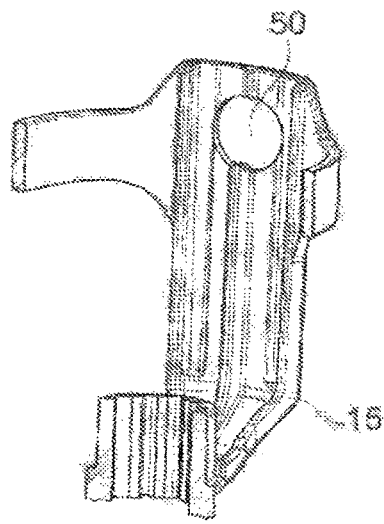
FIG. 8 is a sectional perspective view of a transmission element.

FIG. 8 is a sectional perspective view of transmission element 15. In this particularly advantageous design, transmission element 15 extends about selector shaft 2 and is disposed to be concentric with the latter. Transmission element 15 has recess 50 for guide element 14.

Figure 9:
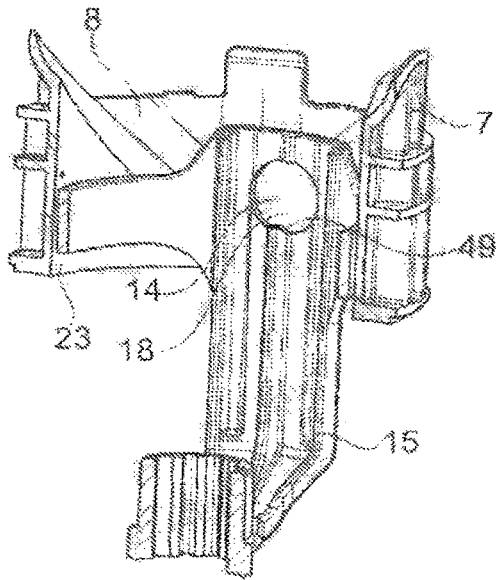
FIG. 9 is a sectional perspective view of the transmission element and a second part of the outer body together with a guide element.

FIG. 9 is a perspective sectional view of transmission element 15 and of second part 23 of outer body 5 together with guide element 14 (in the present case, ball 18). In particular, second part 23 also extends about selector shaft 2 and is disposed to be concentric with selector shaft 2 in a corresponding way. Second part 23 includes the lower part of cam track 8 with the at least one lowest point 11. In addition, locking mechanism 7 is provided for connection with first part 22 of outer body 5.

In accordance with a particularly advantageous embodiment, transmission element 15 has stop 49 for dome 18, so that once transmission element 15 has been mounted inside outer body 5, ball 18 is disposed in cam track 8 and is prevented from falling out in radially inward direction 19.

Figure 10:
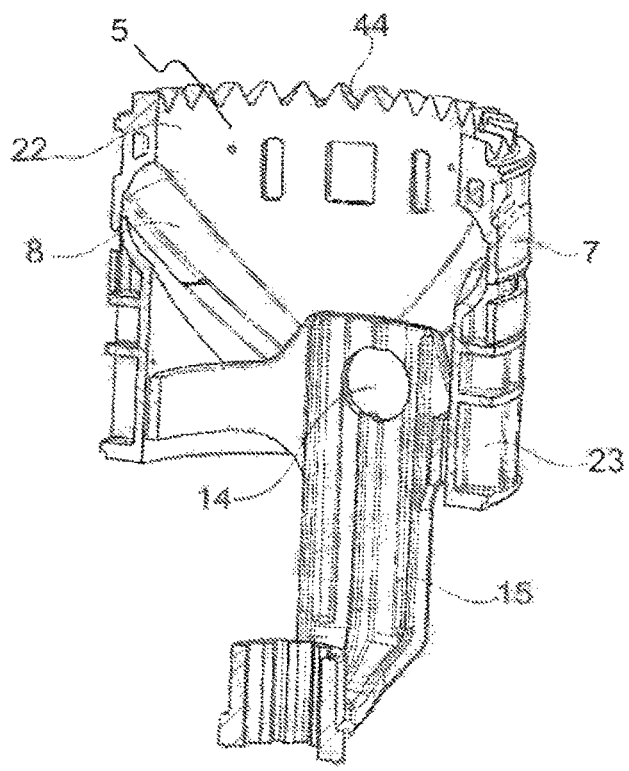
FIG. 10 is a sectional perspective view of the transmission element and the outer body together with a guide element.

FIG. 10 is a perspective sectional view of transmission element 15 and outer body 5 together with guide element 14 (i.e., ball 18). Outer body 5 is formed of first part 22 and of second part 23, which jointly form cam track 8. First and second parts 22, 23 are interconnectible by locking mechanism 7. In the present case, first part 22 has crown spline 44 interacting with selector gear 42 of single-motor gearshift actuator 3.

Figure 11:
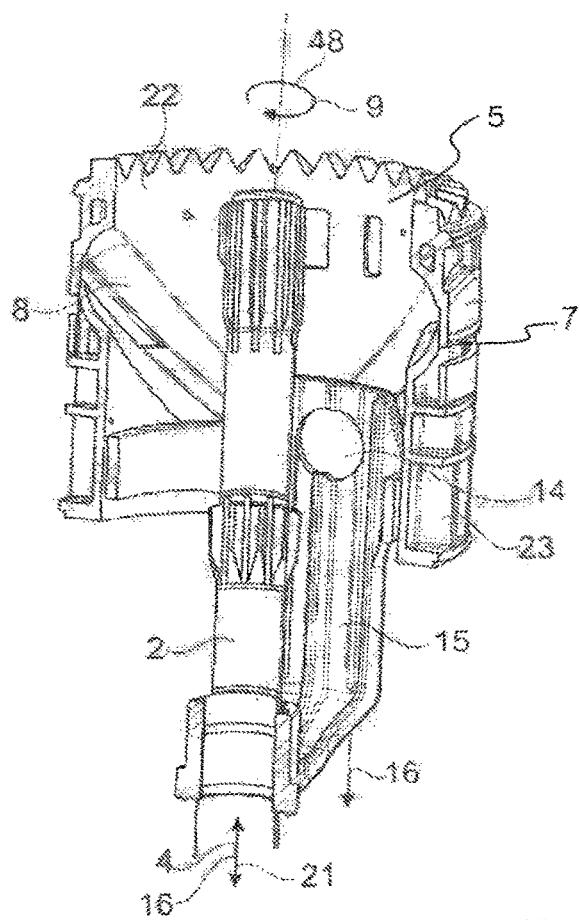
FIG. 11 is a sectional perspective view of the transmission element and the outer body together with a guide element and the selector shaft; and, FIG. 12 is a lateral sectional view of a cam mechanism arrangement.

FIG. 11 is a perspective sectional view of transmission element 15 and outer body 5 together with guide element 14 (i.e., ball 18) and selector shaft 2. Selector shaft 2 extends concentrically relative to transmission element 15 and outer body 5. Selector shaft 2 is disposed on transmission element 15 so as to be free to rotate. Yet, transmission element 15 and selector shaft 2 are interconnected in such a way that movement 16 in direction 21, perpendicular to circumferential direction 9, is carried out together. Thus rotation of outer body 5 relative to selector shaft 2 (for instance caused by selector gear 42) causes cam track 8 to move relative to transmission element 15 and selector shaft 2 in circumferential direction 9. Due to this movement in circumferential direction 9, guide element 14 moves up and down along cam track 8 and inside sliding guide 13 (see also FIG. 12). Thus, guide element 14 forces transmission element 15 to carry out movement 16 in direction 21, perpendicular to circumferential direction 9. Transmission element 15 transmits movement 16 to selector shaft 2, implementing selecting movement 4.

On the other hand, single-motor gearshift actuation device 3 (see description of FIG. 1) may be used to carry out shifting movement 48 in circumferential direction 9, i.e., a rotation of selector shaft 2 in circumferential direction 9 without shifting movement 48 being transmitted to transmission element 15. Thus, in this process, transmission element 15 is not moved along cam track 8 of outer body 5, so that the position in direction 21, perpendicular to circumferential direction 9, remains unchanged.

Figure 12:
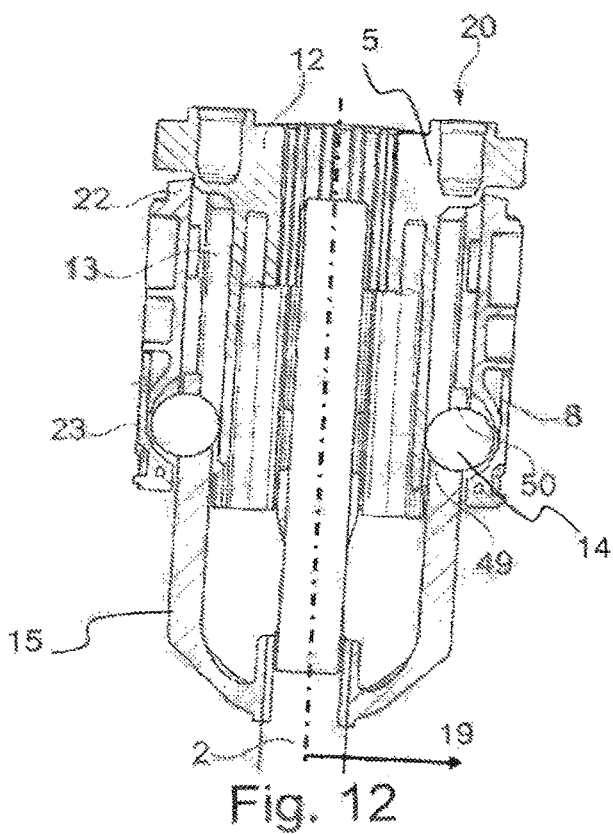

FIG. 12 is a sectional side view of cam mechanism arrangement 20. It can be seen that compared to the representation of FIG. 11, first part 22 and second part 23 are arranged in a different way. It can be seen that cam track 8 is disposed in outer body 5 and receives guide element 14. Guide element 14 continues to be disposed in sliding guide 13 of inner body 12. First part 22 and second part 23 are interconnected by locking mechanism 7. Here, guide element 14 is embodied as ball 18, which is prevented from falling out of transmission element 15 in radially inward direction 19 by stop 49. This provides for an easy assembly of cam mechanism 1 and cam mechanism arrangement 20.

It can be seen that outer body 5 and thus cam track 8 are particularly advantageously composed of the two parts (first part 22 and second part 23). Thus, cam track 8 may be held open as cam mechanism 1 is assembled, allowing guide elements 14 to be mounted together with transmission element 15 in outer body 5. Only then is the other part, i.e., first part 22 or second part 23, fixed to outer body 5 part 22, 23 (that has been used first) by locking mechanism 7 so that cam track 8 is closed and guide element 14 is prevented from falling out of cam track 8. For this purpose, stop 49 for guide element 14 is provided in recess 50 on transmission element 15 to fix guide element 14 between transmission element 15 and cam track 8.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE SYMBOLS 1 cam mechanism
2 selector shaft
3 single-motor gearshift actuation device
4 selecting movement
5 outer body
6 inner circumferential surface
7 locking mechanism
8 cam track
9 circumferential direction
10 highest point
11 lowest point
12 inner body
13 sliding guide
14 guide element
15 transmission element
16 movement
17 rolling body
18 ball
19 radial direction
20 cam mechanism arrangement
21 direction (perpendicular to circumferential direction 9)
22 first part
23 second part
24 spindle
25 spindle nut
26 gear rack
27 first gear
28 second gear
29 shaft gear
30 spindle axis
31 motor
32 spur gear spline
33 motor spindle
34 first direction of rotation
35 second direction of rotation
36 hollow gear inner spline
37 shift lever
38 locking device
39 third gear
40 first axial position region
41 freewheel
42 selector gear
43 selector pot
44 crown spline
45 axial movement
46 spline
47 motor vehicle transmission device
48 shifting movement
49 stop
50 recess
51 operative connection
52 housing

What is claimed is:

1. A cam mechanism for actuating a selector shaft, in particular for a single-motor gearshift actuation device, in particular for carrying out a selecting movement of the selector shaft, comprising: a cylindrical outer body with an inner circumferential surface and a cam track disposed on the inner circumferential surface, the cylindrical outer body having an endless periodicity in a circumferential direction with at least one highest point and at least one lowest point; an inner body having at least one sliding guide extending in a direction perpendicular to the circumferential direction; at least one guide element disposed in the cam track and in the sliding guide; and, a transmission element in operative connection with the at least one guide element or including the at least one guide element, the transmission element suitable for transmitting a movement of the guide element in a direction perpendicular to the circumferential direction to the selector shaft arrangeable to be concentric with the inner circumferential surface.

2. The cam mechanism as recited in claim 1, wherein the guide element is a rolling body firmly connected to the transmission element.

3. The cam mechanism as recited in claim 1, wherein the guide element is a ball firmly connected to the transmission element.

4. The cam mechanism as recited in claim 1, wherein the guide element is a type of pin firmly connected to the transmission element.

5. The cam mechanism as recited in claim 1, wherein the outer body has at least two parts, a first part and a second part, wherein the cam track with the highest point is disposed in the first part and the cam track with the lowest point is disposed in the second part.

6. The cam mechanism as recited in claim 1, wherein the outer body is movable in the circumferential direction independently of the transmission element and the sliding guide.

7. The cam mechanism as recited in claim 1, wherein an operative connection of the transmission element and the guide element is disposed in a radial direction between the sliding guide and the cam track.

8. The cam mechanism as recited in claim 1, wherein the cam mechanism has two guide elements and comprises two transmission elements and two sliding guides, wherein the two guide elements are disposed opposite one another in the cam track on the inner circumferential surface.

9. A cam mechanism arrangement comprising a cam mechanism as recited in claim 1 and a selector shaft, wherein the selector shaft is disposed to be concentric with the inner circumferential surface and connected to the at least one transmission element in such a way that the selector shaft is: free to rotate in a circumferential direction relative to the transmission element so that the selector shaft is free to rotate in the circumferential direction relative to the outer body and relative to the transmission element; and, movable up and down together with the transmission element in a direction perpendicular to the circumferential direction.

10. A method for assembling a cam mechanism, the method comprising:
providing a cylindrical outer body with an inner circumferential surface and a cam track disposed on the inner circumferential surface, the cylindrical outer body having an endless periodicity in a circumferential direction with at least one highest point and at least one lowest point, wherein the outer body has a first part and a second part, wherein the cam track with the highest point is disposed in the first part and the cam track with the lowest point is disposed in the second part;
providing at least one guide element;
providing at least one transmission element;
arranging the first part or the second part with the at least one transmission element and the at least one guide element relative to one another in such a way that the guide element is disposed in the cam track and in operative connection with the transmission element; and,
joining the first part and the second part to form the cam track.

11. The method for assembling a cam mechanism as recited in claim 10, wherein the at least one guide element is connected to a housing of a single-motor gearshift actuation device and wherein subsequently the cam mechanism is operatively connected to the guide element and the housing.

12. A method for assembling a cam mechanism arrangement, comprising:
providing a cylindrical outer body with an inner circumferential surface and a cam track disposed on the inner circumferential surface, the cylindrical outer body having an endless periodicity in a circumferential direction with at least one highest point and at least one lowest point, wherein the outer body has a first part and a second part, wherein the cam track with the highest point is disposed in the first part and the cam track with the lowest point is disposed in the second part;
providing at least one guide element;
providing at least one transmission element;
arranging the first part or the second part with the at least one transmission element and the at least one guide element relative to one another in such a way that the guide element is disposed in the cam track and in operative connection with the transmission element;
joining the first part and the second part to form the cam track;
providing a selector shaft; and,
connecting the at least one transmission element to the selector shaft.

13. The method for assembling a cam mechanism arrangement as recited in claim 12, wherein the at least one guide element is connected to a housing of a single-motor gearshift actuation device and wherein subsequently the cam mechanism arrangement is operatively connected to the guide element and the housing.

* * * * *